(No Model.) 3 Sheets—Sheet 1.
A. M. COMMUN.
APPARATUS FOR LOADING OR UNLOADING CARS.
No. 498,155. Patented May 23, 1893.
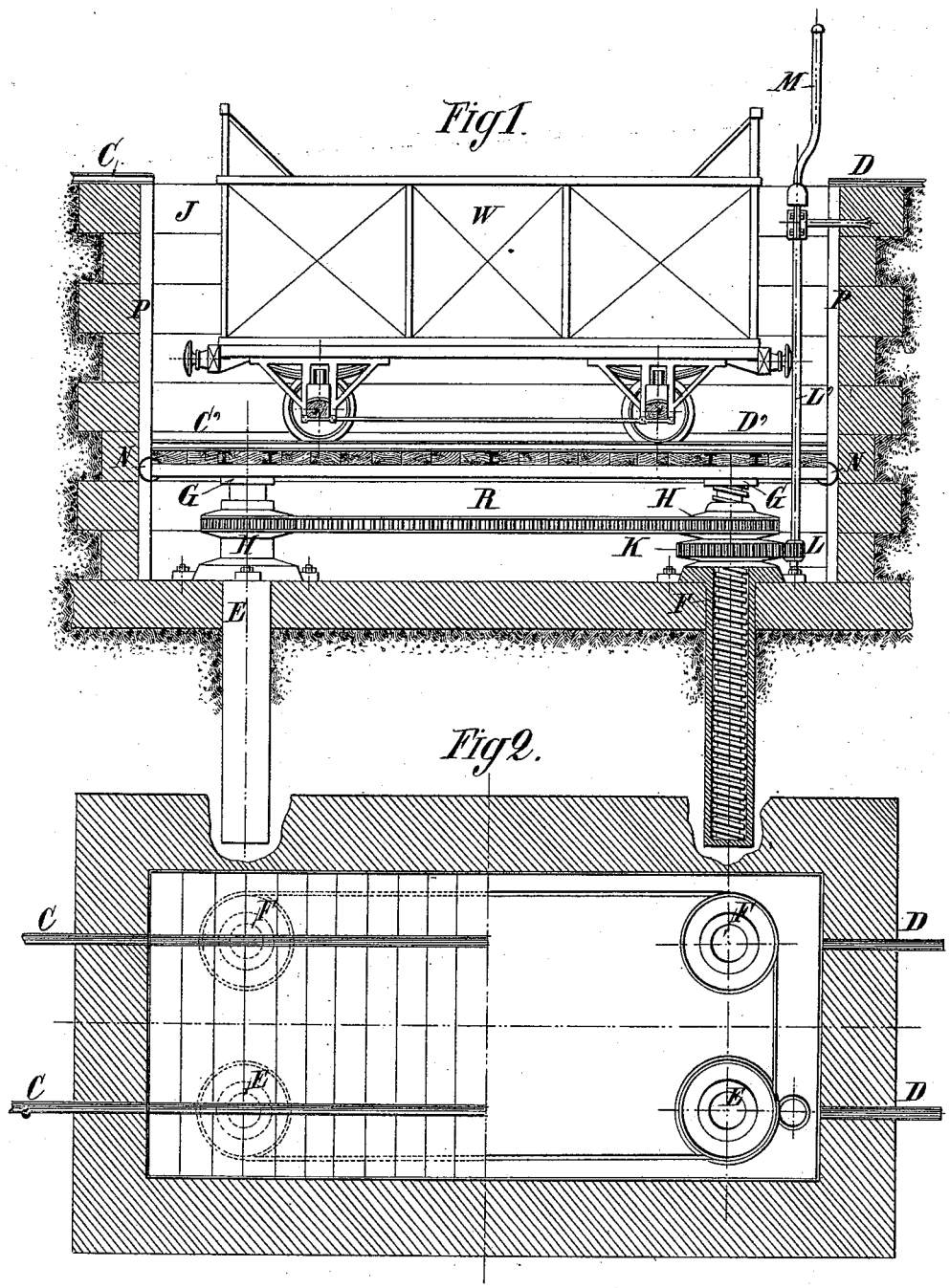

(No Model.)   3 Sheets—Sheet 2.

A. M. COMMUN.
APPARATUS FOR LOADING OR UNLOADING CARS.

No. 498,155. Patented May 23, 1893.

(No Model.) 3 Sheets—Sheet 3.

A. M. COMMUN.
APPARATUS FOR LOADING OR UNLOADING CARS.

No. 498,155. Patented May 23, 1893.

United States Patent Office.

ALFRED MATHURIN COMMUN, OF RHEIMS, FRANCE.

APPARATUS FOR LOADING OR UNLOADING CARS.

SPECIFICATION forming part of Letters Patent No. 498,155, dated May 23, 1893.

Application filed February 25, 1893. Serial No. 463,732. (No model.) Patented in France October 27, 1892, No. 225,214.

*To all whom it may concern:*

Be it known that I, ALFRED MATHURIN COMMUN, of Rheims, France, have invented certain new and useful Improvements in Apparatus for Loading and Unloading Cars, &c., which are fully described in the following specification, and for which I have obtained Letters Patent in France October 27, 1892, No. 225,214.

The handling necessary in loading and unloading cars and wagons is both tedious and expensive in time and labor. For example, the loading of a car with vegetables, grain, &c., or mineral ores, stone, and many articles of general merchandise, adds greatly to the cost of these articles to the consumer, and in case of many commodities of small value, the expense of handling is such as to be practically prohibitive.

The great bulk of freight transported by railways is transferred to and from the freight cars by hand, which is attended with obvious disadvantages.

The object of my invention is to facilitate the transfer of freight articles from a wagon or other vehicle on the level or grade of the road to a freight car, and vice versa, and this object I accomplish by means of appliances illustrated in the accompanying drawings.

Figure 5:
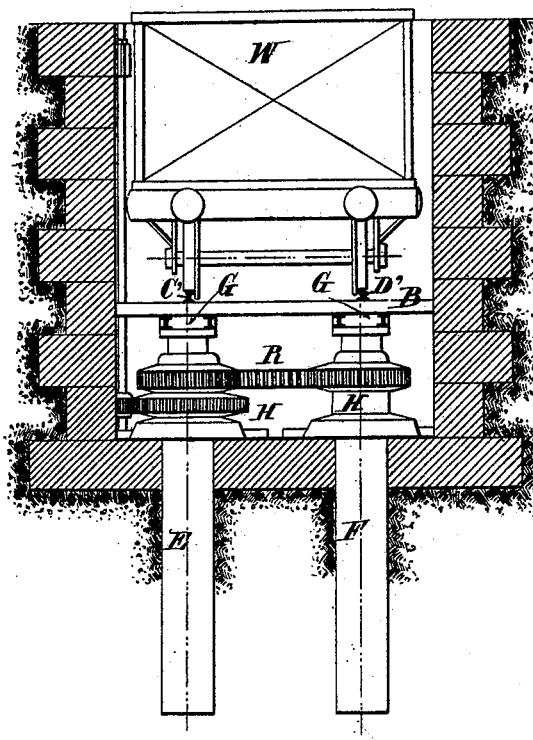

Figure 1 is a longitudinal section; Fig. 2, a plan view; Fig. 3, a cross-section, and Fig. 4 a longitudinal section showing the position occupied by the car during its discharge from underneath. Fig. 5, is a longitudinal section of a platform constructed in accordance with my system, adapted for the manipulation of long and heavy bodies, such as cannons, boilers, carriages, &c.

Figure 4:
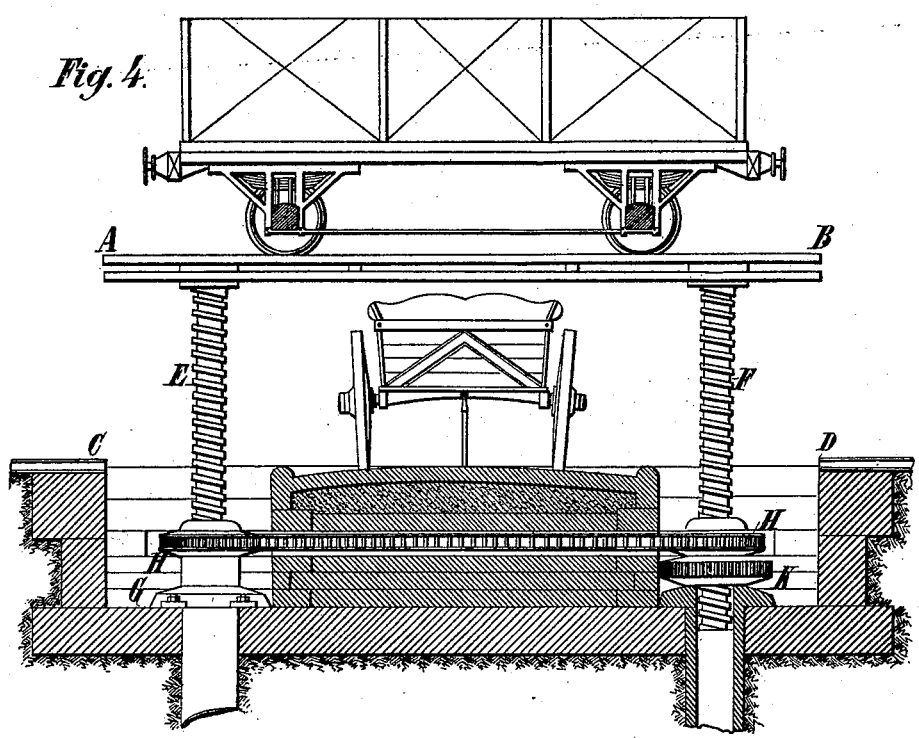
Figure 5:
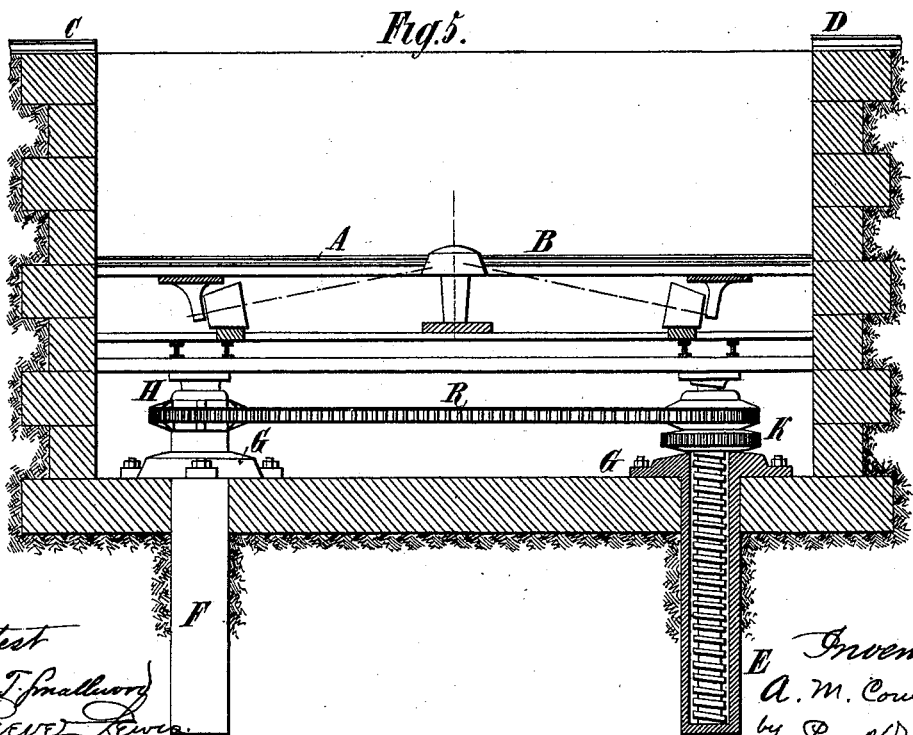

The side-track C D, upon which are placed the cars to be loaded or unloaded, is intersected by a movable platform A B of suitable dimensions, which in its normal position is arranged so as to present no interruption to the passage of trains. To this end it is maintained by suitable supports at a level such that the rail-sections upon it form a continuation of the track. This platform A B is movable and is capable of being lowered into a well as shown in Figs. 1, 2, 3 and 5 and to be elevated above the level of the track-rails as shown in Fig. 4. The said platform rests upon a sufficient number of screw-jacks E F (four being shown in the drawings). They are attached to the under side of the platform by the plates G and are screwed into rotating nuts H. Upon an auxiliary shaft L' is mounted a toothed pinion L which meshes with cogwheel K fast upon or being part of one of the nuts before referred to. Each screw-jack is provided with its nut which has an external gear, all being connected and driven by an endless chain R, so that under the impulse of pinion L all the nuts are moved simultaneously, raising or lowering the platform. The rotation of the shaft L' is obtained by means of crank M which may be operated by hand. It is evident that power may be increased by multiplying the gear. The platform is guided in its movement by friction-rollers N sliding in guides. It is evident that any mechanical, electrical or hydraulic power may be substituted for that described.

The operation is as follows:—Suppose an empty car is to be loaded. It is placed upon the platform and the latter lowered until the upper part of the car reaches the level of the ground. If the merchandise can be handled without precautions it would suffice to dump the carts directly into the car. In this way vegetables, and in general all such merchandise may be loaded in bulk. If heavy or brittle substances that are not capable of being handled by hand, shovels or fork, such as bales of cotton, stone, or other baled goods such as hay or rags, the floor of the cart is placed on the level corresponding with that of the vehicle upon which the merchandise is brought, so that the two floors constitute a horizontal floor upon which the merchandise may be rolled or slid. These manipulations will suggest themselves to every operator. For handling heavy pieces of artillery and other similar bodies I use my platform surmounted by a turn-table as shown in Fig. 5. Such pieces are generally loaded upon flat cars. To operate them inclined planes are generally used, and the pieces are slid or rolled upon the car.

By the use of my platform, in combination with a turn-table I dispense with inclined planes, as will be seen from the explanation as follows:—The car upon which the burden is to be placed is brought upon the movable platform, which is lowered until the floor of the car is on a level with the ground or vehicle which is to be unloaded. At this moment the turn-table is rotated until the longitudinal axis of the car makes a certain angle with the longitudinal axis of the body to be loaded. It is then only necessary to roll or slide this piece upon the car and to lift the platform, after having replaced it in its normal position. For the unloading, the operation is conducted in a similar manner. But I can effect it rapidly and economically by a special apparatus shown in Fig. 4. Instead of sinking in a well, I cause the platform to rise above the level of the track to such a height that a vehicle may pass beneath. By means of a movable panel in the bottom of the car the merchandise may be dropped directly into the vehicle destined to receive it.

Various devices have been heretofore proposed to reduce the cost of the handling of goods incident to their transshipment or conveyance from one vehicle to another, and these devices partake of the principle of hoisting the vehicle containing the goods to be transshipped to a higher level than the vehicle which is to receive the same so as to allow the goods to be dumped or slid from the former into the latter. So far as I am informed all or nearly all of such contrivances involve the necessity not only of hoisting devices but also of inclined planes which latter require more or less development or extension, and consequently valuable space, costly apparatus and much power and manipulation. Moreover, some systems of this general character include and depend upon auxiliary tracks at high level and on grade, respectively, hoisting mechanism connecting the two tracks, and special loading-cars designed to be hoisted from the low to the high level for the purpose of dumping into the ordinary cars.

My system, which involves a movable track section which is itself part of the main track or siding, capable of being hoisted or depressed, and thus raising or lowering the freight car itself, is readily distinguishable in principle and mode of operation from the systems above referred to.

What I claim as my invention is—

1. The combination, with the permanent track or siding of a railroad, of a movable track section which is normally part of the main track or siding, and means for lifting the same above or lowering it below the grade of said permanent track, to allow a freight car standing upon said track section to be elevated with reference to any vehicle or receptacle to be loaded from said car, or to be lowered with reference to any vehicle or receptacle to be emptied into said car, substantially as described.

2. The combination, with the permanent track or siding of a railroad, of a movable track section, normally forming part of the said permanent track or siding, a series of screw jacks, extending into casings sunk in the ground and supporting said movable track section, and operating means, actuated from the surface of the road, for simultaneously imparting motion to said screw jacks to raise or depress said movable track section, substantially as described.

3. The combination, with the permanent track or siding, of a well or pit formed in the ground under said section and capable of receiving the same, and hoisting means including screw jacks inclosed in casings sunk in the ground at the bottom of said well or pit, substantially as described.

4. The combination, with the permanent track or siding of a railroad, of a movable track section, and means for lifting the same above or lowering it below the grade of said permanent track and a turn-table upon said movable track, substantially as described.

In testimony whereof I have signed this specification, in the presence of two subscribing witnesses, at Rheims, France, this 24th day of January, 1893.

ALFRED MATHURIN COMMUN.

Witnesses:
 FRANÇOIS MERTENS,
 HUBERT ALVIN.